(12) United States Patent
Hohne

(10) Patent No.: US 6,373,427 B1
(45) Date of Patent: Apr. 16, 2002

(54) RADAR DISTANCE MEASURING DEVICE

(75) Inventor: Felix Hohne, Aschheim (DE)

(73) Assignee: Mikrowellen-Technologie und Sensoren GmbH (DE)

( * ) Notice: Subject to any disclaimer, the term of this patent is extended or adjusted under 35 U.S.C. 154(b) by 0 days.

(21) Appl. No.: 09/485,380

(22) PCT Filed: Aug. 6, 1998

(86) PCT No.: PCT/EP98/04916

§ 371 Date: May 12, 2000

§ 102(e) Date: May 12, 2000

(87) PCT Pub. No.: WO99/08128

PCT Pub. Date: Feb. 18, 1999

(30) Foreign Application Priority Data

Aug. 11, 1997 (DE) .......................................... 197 34 713

(51) Int. Cl.[7] ................................................ G01S 13/22
(52) U.S. Cl. .................... 342/128; 342/129; 342/135; 342/137; 342/145; 342/192; 342/196
(58) Field of Search ................................. 342/118, 127, 342/128, 129, 130, 131, 134, 135, 137, 145, 192, 195, 196

(56) References Cited

U.S. PATENT DOCUMENTS

| 3,522,527 | A | | 8/1970 | Williams et al. |
| 3,628,136 | A | | 12/1971 | Jonas |
| 4,211,987 | A | | 7/1980 | Pan |
| 4,781,063 | A | | 11/1988 | Osaki et al. |
| 4,890,054 | A | | 12/1989 | Maeno et al. |
| 4,943,778 | A | | 7/1990 | Osake |
| 5,023,618 | A | | 6/1991 | Reits |
| 5,325,095 | A | | 6/1994 | Vadnais et al. |
| 5,396,250 | A | * | 3/1995 | Tsui et al. ..................... 342/13 |
| 5,504,490 | A | | 4/1996 | Brendle et al. |
| 5,596,325 | A | | 1/1997 | Maas |
| 6,107,957 | A | * | 8/2000 | Cramer et al. .............. 342/124 |

FOREIGN PATENT DOCUMENTS

| DE | 40 40 084 A1 | 6/1992 |
| DE | 195 43 179 A1 | 5/1997 |
| DE | 198 33 220 A1 | 6/1999 |
| EP | 0 121 824 A1 | 3/1983 |
| EP | 0 558 759 A1 | 9/1993 |
| GB | 1331525 | 9/1973 |
| JP | 57197734 | 5/1984 |
| JP | 07030584 | 8/1996 |
| SU | 1103098 | 7/1984 |

* cited by examiner

Primary Examiner—John B. Sotomayor
(74) Attorney, Agent, or Firm—Jenkins & Wilson, P.A.

(57) ABSTRACT

The invention relates to a radar distance measuring device. An especially linear frequency-modulated high frequency signal is emitted via an antenna and mixed with an echo signal reflected by a target object whose distance is to be determined. The distance of said target object can then be calculated by analyzing the frequency of the mix result. The aim of the invention is to improve the distance resolution or increase the accuracy of measurement. To this end, a first frequency analysis is first carried out to obtain a rough analysis result. Said rough analysis result is used to control a filtering device which then restricts the mix result in its time range to a segment around the frequency of the target object. A discrete Fourier transformation is then carried out for this segment in order to produce an analysis result with a more refined scanning step than the first frequency analysis. The measuring result is further refined, preferably by taking into account not only the frequency of the mix result as determined by the target object but also the phase relation of the oscillation of this frequency and by supplementing the measuring result with a corresponding wavelength fractional part.

12 Claims, 4 Drawing Sheets

RADAR DISTANCE MEASURING DEVICE

FIELD OF THE INVENTION

The invention relates to a radar range measuring device with a transmitter directing a frequency-modulated continuous radio frequency signal via an antenna onto an object placed at the range to be determined; with a mixing stage which combines with one another, on the one hand, signals tapped from the transmitter, and, on the other hand, echo signals received from the target object via the antenna and/or another antenna; with a frequency analysis device for frequency analysis of the mixing result; and with a display device to display the range corresponding to a target-object-specific frequency of the mixing result.

DESCRIPTION OF RELATED ART

In known radar range measuring devices with sawtooth frequency modulation, the frequency swing (difference between upper frequency limit and lowerfrequency limit) of the frequency modulation of the transmit signal is used to determine the range resolution, which is related to the frequency swing via the following equation:

range resolution=speed of light/2*frequency swing

For example, if a range resolution of 10 cm is required, then for known radar range measuring devices operating on the FMCW principle it is necessary to provide a frequency swing of 1.5 GHz. But if a smaller frequency swing has to be selected, e.g., because of bandwidth restrictions imposed by licensing regulations of the postal administration, then the range resolution is worsened correspondingly toward larger values.

In EP-A-0647957 a method is described which provides a large number of measuring cycles in order to improve the measuring accuracy and/or the range resolution.

The problem to be solved by the invention is to configure a radar range measuring device of the general type briefly described here in above so that a high range resolution is achieved when the frequency swing of the frequency modulation of the transmit signal is limited, without any need to perform a large number of measuring cycles.

SUMMARY OF THE INVENTION

That problem is solved according to the invention by the characterizing features of patent claim 1 hereinbelow.

Advantageous configurations and developments are the subject matter of the patent claims subordinated to claim 1, to whose content express reference is made here without repeating their wording at this point.

But it should be noted that for full exploitation of the advantages achieved by the invention it is important that the frequency modulation of the frequency of the oscillation radiated toward the target object be performed with utmost precision, preferably a linear or sawtooth frequency modulation being selected.

According to a very suitable embodiment of a radar range measuring device of the type indicated here, that modulation is performed by adjustment of an oscillator to specified frequencies in a highly precise manner within each period corresponding to the sampling clock of the signal processing, those frequencies having values which are located with corresponding accuracy on the desired frequency characteristic versus time, i.e., exactly on a straight line in the case of sawtooth modulation.

Another important improvement of a radar range measuring device of the type indicated here is that the phase position of the determined target-object-specific frequency is obtained and evaluated as the result of a direct Fourier transformation, i.e., in the sense that, to determine the range being measured, one not only counts out the full periods of the target-object-specific frequency of the mixing result but rather one supplements the corresponding multiple of the wavelength by the fraction of the wavelength corresponding to the phase angle.

BRIEF DESCRIPTION OF THE DRAWINGS

Exemplary embodiments are described hereinbelow with reference to the drawing, in which.

DETAILED DESCRIPTION OF THE INVENTION

Figure 1:
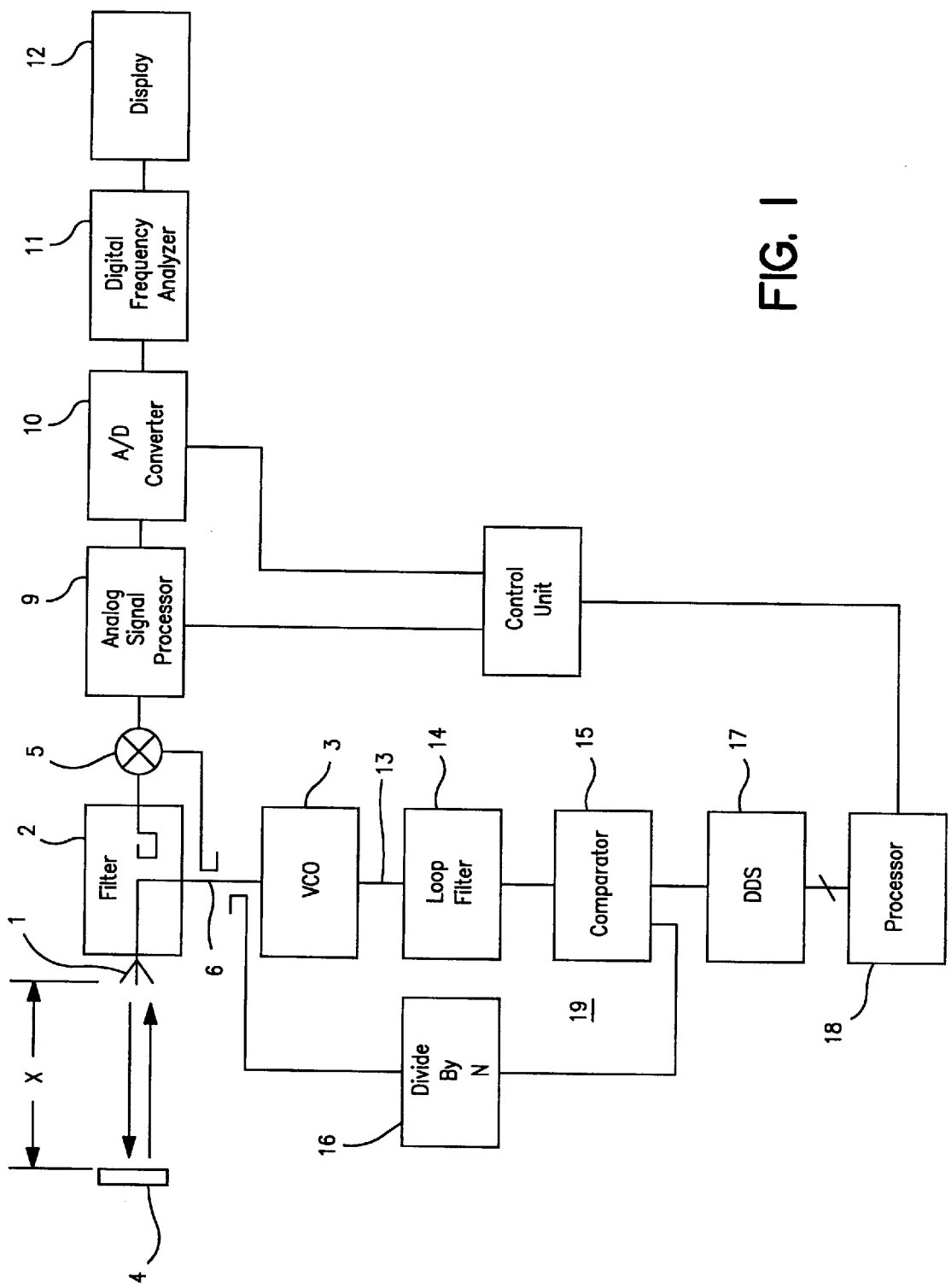
FIG. 1 shows a schematic block diagram of a radar range measuring device of the type indicated here.

The radar range measuring device according to FIG. 1 contains a transmit/receive antenna 1, e.g., in the form of a horn radiator to which a frequency-modulated oscillation is fed from an oscillator 3 in the form of a voltage-controlled oscillator via a transmit/receive separating filter 2 or a coupler of suitable type. The transmit/receive antenna 1 emits a transmit signal corresponding to a sawtooth pulse with linear frequency modulation, e.g., from 24.0 GHz to 25.5 GHz, toward a target object 4 located at a range x from the transmit/receive antenna, which is to be determined.

Figure 4:
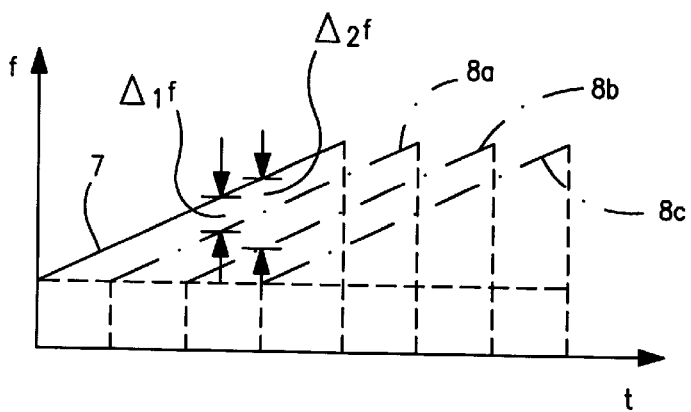
FIG. 4 shows a highly simplified diagram of the transmit frequency as a function of time and the time-dependent frequency response of target-object-specific echo signals.

An echo signal of the transmitted signal reflected from the target object 4 is received by the antenna 1 and is out-coupled by a directional coupler in the separating filter 2 to a mixer 5, which receives as a second input signal a portion of the transmit signal out-coupled by a directional coupler 6. Thus, whereas the portion of the transmit signal out-coupled by the directional coupler 6 arrives essentially immediately at the mixer 5, the portion of the echo signal corresponding to the transmit signal which is reflected from the target object 4 and out-coupled to the mixer 5 has an electrical path length of 2x behind it. Therefore, the homodyne superposition occurring in the mixer 5 leads to the difference frequency at the mixers output, As is shown qualitatively in FIG. 4, that difference frequency is to be measured between the transmit signal, which is identified by the characteristic 7, and the echo signals, which are identified by the characteristics 8a, 8b, 8c, . . . and are reflected from target objects at various ranges and have essentially sawtooth modulation, and that difference frequency is directly proportional to the range x being determined. The corresponding relationships are fully familiar to the person skilled in the art.

Figure 2:
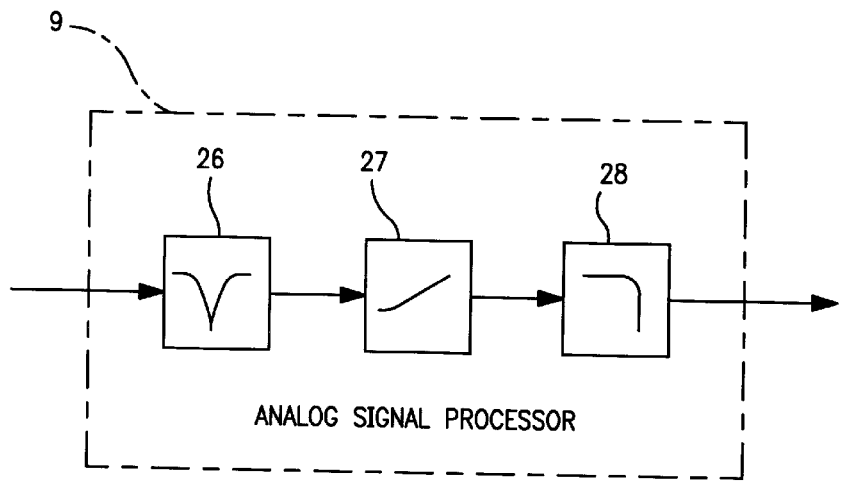
FIG. 2 shows a schematic block diagram of an analog signal processor of the circuit according to FIG. 1.

The mixing result of the mixer 5, having the difference frequency between the transmit signal and the echo signal, is input into an analog signal processor 9 whose task is to eliminate certain inherent interference properties of the transmit and receive components, certain influences of the geometry of the target object and transmit/receive antenna and possible difficulties in interpreting the measurement result. That will be discussed further below with reference to FIG. 2.

Figure 5:
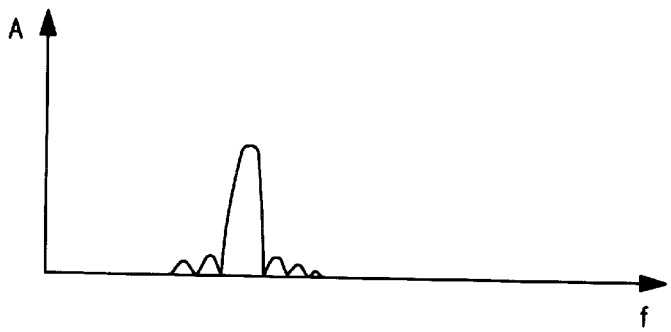
FIG. 5 shows a simplified diagram of the frequency spectrum of the mixing result of a transmit signal and of a receive signal from an idealized target.

The output signal of the analog signal processor 9 reaches an analog/digital converter 10, whose digital signals are fed to a digital frequency analysis device 11. That frequency analysis device generates essentially a frequency spectrum of the mixing result of the mixer 5 digitized by the analog/digital converter 10. That frequency spectrum can have the form indicated qualitatively in FIG. 5 if the radio frequency energy emitted by the transmit/receive antenna 1 has, for example, liner frequency modulation within a limited period of time and impinges as a sharply focused beam onto a single target object. The fact that in such a case the frequency spectrum according to FIG. 5 ford not contain a single frequency line corresponding to the sought range is based on the temporal limitation of the transmitter's sawtooth pulse.

After analogization of the output signal of the digital frequency analysis device 11, that signal can display the measured range x in the display device 12.

A voltage-controlled oscillator 3 receives a control signal, determining the frequency of its output signal, via the line 13 from a loop filter 14 in the form of an I or PI or PID controller, whose input is fed with the output signal of a comparator 15. That comparator receives as one input signal an oscillation or pulse sequence having a frequency corresponding to the output frequency of the voltage-controlled oscillator 3 divided by the divisor N. The second input signal to the comparator 15 is an oscillation or pulse sequence having a frequency variation corresponding to the desired frequency modulation of the output signal of the voltage-controlled oscillator 3, taking into consideration the divisor introduced by the frequency divider designated by 16. That second input signal to the comparator 15 is generated by direct digital synthesis in the DDS unit 17. For that purpose, the DDS unit 17 receives, from a processor 18, digital words corresponding to certain instantaneous frequencies of the frequency modulation, which lead to a highly precise presetting of a frequency setpoint value in the comparator 15. Thus, in the circuit of FIG. 1, the components 13, 14, 15 and 16 form a phase-locked loop 19 whose effect is that whenever the analog/digital converter 10 takes a digital sample value from the mixing result of the mixer 5, the voltage-controlled oscillator 3 has the transmit frequency corresponding to the desired frequency response of the frequency modulation with high accuracy at just that time. The phase-locked loop 19 operates fast enough so that from sampling to sampling by the A/D converter 10 it can carry out its control task for each new point on the precisely linear sawtooth curve of the frequency modulation.

For example, in the operating frequency range of approximately 24 GHz selected for the voltage-controlled oscillator 3, the divider 16 performs a frequency division in the MHz range and, accordingly, the output signal of the DDS unit also lies in the MHz range. The comparator 15 performs a phase comparison or frequency comparison of the output signals of the components 16 and 17 and, via the filter 14, brings about a readjustment of the output signal of the voltage-controlled oscillator 3 to an accuracy of within a few Hz. That adjustment is accomplished after a transient time of the PLL circuit 19 of a few microseconds after each new frequency setpoint value is preset by the DDS unit 17. For that reason, when there is a sequence of, e.g., 1024 samplings by the A/D converter 10, the control processes of the PPL circuit in conjunction with the DDS unit 17 relating to individual points on the characteristic of the frequency modulation are lined up [in time] to comprise a total duration on the order of milliseconds.

The previously described, highly exact dynamic frequency adjustment, particularly the linearization of the transmit oscillator, makes especially conspicuous the actions taken within the frequency analysis device 11 as described hereinbelow.

First of all, however, the construction of the analog signal processor 9 shall be discussed in more detail.

Figure 6:
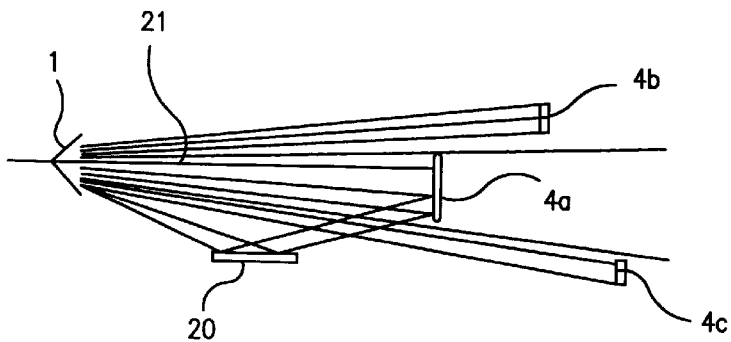
FIG. 6 shows a schematic picture of a transmit and receive antenna and various objects located in its transmit and receive beam, one of which is the target object whose range is of interest.

FIG. 6 shows a situation, approximating the conditions existing in practice, between a transmit/receive antenna 1 and a number of objects 4a, 4b, 4c . . . of different sizes and at different distances from the antenna 1 as well as an object 20 in the surroundings along the path between the antenna and the objects. In practice, the transmit/receive antenna 1 does not generate a sharply focussed beam but rather a radiation fan 21 corresponding to a particular directional characteristic of the utilized radiator. Accordingly, the transmit/receive antenna 1 receives echo signals which have different electrical path lengths behind them, i.e., the echo signals from the target objects 4a to 4c located at different ranges and also the echo signals which, for example, after reflection at the target object 4a reach the antenna 1 only after further reflection at the object 20, for which reason path lengths having certain intermediate values also result.

Figure 7:
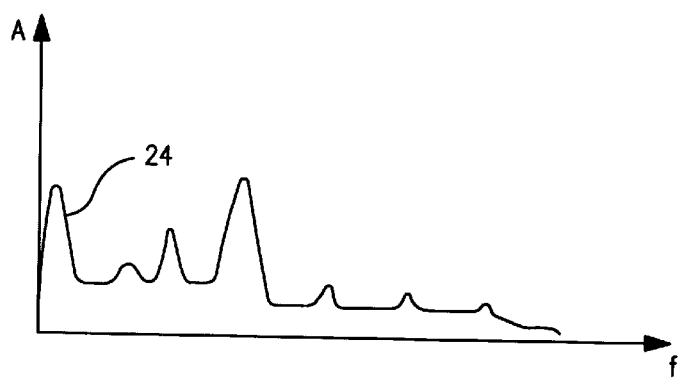
FIG. 7 shows a schematic frequency spectrum of the mixing result of transmit and receive signals based on a situation as illustrated schematically in FIG. 6.
Figure 8:
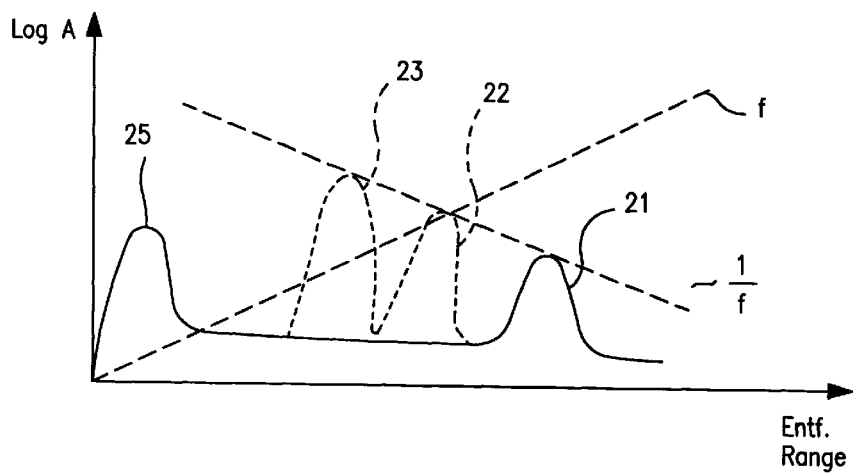
FIG. 8 shows a diagram in which the logarithm of the amplitude of the mixing result of transmit and receive signals is plotted versus the range (equivalent to the frequency of the mixing result), in order to explain the effects of the influence on the signal at the location of the transmitter itself and the influence of the distance of the target object from the transmitter.

FIG. 7 shows in a purely qualitative manner a frequency spectrum of the mixing result for the evaluation of the signals as they are received in a situation corresponding to FIG. 6. It should be observed here that target objects of equal size but at different distances from the transmit/receive antenna 1 shadow the transmit beam to an increasingly smaller extent as the distances become larger, and consequently the echo signals associated with the individual target objects generate smaller amplitudes with increasing distance to the target object. This is shown in FIG. 8 for a target object having a predetermined reflecting area normal to the propagation direction of the transmit signals. In the diagram of FIG. 8 in which the logarithm of the amplitude is plotted versus range, such a target object generates a maximum designated by 21 at the predetermined range. If the target object is drawn nearer to the transmit/receive antenna 1, then because of the geometric conditions the result is that the amplitude maxima become larger as the distance becomes smaller, as is designated by 22 and 23 in FIG. 8.

With practical embodiments of the device indicated here, one also finds a pronounced maximum near the lower end of the frequency spectrum of the mixing result according to FIG. 7, as is designated by 24 in FIG. 7 and which corresponds to the maximum 25 in the graph of the logarithm of the signal amplitude as a function of range in FIG. 8.

The maxima 24 and 25 in the frequency spectrum and in the graph of the logarithm of the signal amplitude as a function of range in FIGS. 7 and 8, respectively, are caused by reflections at transitions of the wave conduction path or by a direct effect of the transmit signal on the receive channel in the transmit/receive antenna 1 or in the separating filter 2 in such a manner that those maxima do not correspond to a concrete target object whose range to the transmit/receive antenna is to be measured.

Besides the maximum 24, the frequency spectrum in FIG. 7 can contain other interference maxima in the low-frequency range, which are caused, for example, by external or internal structures in the surroundings and which can have effects on the spectrum evaluation that are just as interfering as reflections at conduction transitions. Once these interfering maxima are able to attain large amplitudes at the output of the mixer 5, they restrict the capability for detecting small targets whose maxima they overshadow.

To stop out such interference, the analog signal processor 9 contains a band-stop filter 26, e.g., a band-stop filter for eliminating the interference maxima 24 located in the lowermost frequency range of the frequency spectrum in FIG. 7.

The band-stop filter 26 of the analog signal processor 9 is followed by a differentiator 27 which has the effect that signal amplitudes caused by target objects at large range are amplified and signal amplitudes caused by target objects at decreasing ranges are attenuated to an increasing extent (FIG. 8, amplitude maxima 21, 22, 23). The differentiator 27 produces a gain proportional to the frequency and thereby enhances the attenuation of the signal amplitude with increasing range to the target object, owing to the geometric conditions.

Finally, the differentiator 27 is followed by an antialiasing filter 28 whose upper cutoff frequency is placed so that frequency ambiguities can be avoided during sampling of the oscillation.

Figure 3:
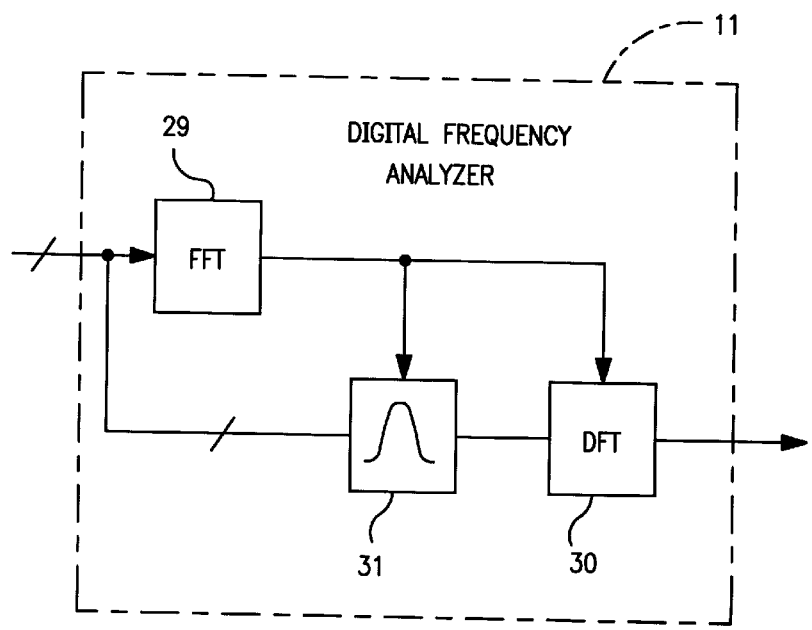
FIG. 3 shows a schematic block diagram of a digital evaluator of the circuit according to FIG. 1.

As shown in FIG. 3, the frequency analysis device 11 contains two frequency analyzers, i.e., in the present exemplary embodiment, a first frequency analyzer for the fast Fourier transformation 29 and a second frequency analyzer for the discrete Fourier transformation 30. The FFT frequency analyzer 29 receives the digital signals from the output of the A/D converter 10 and, at the output side, supplies as the coarse analysis result information about the position of the frequency spectrum sampling step in which the target-object-specific maximum of the spectrum generated by the FFT frequency analyzer 29 is located. That information is used as a control signal for a digital group-delay-compensated bandpass filter device 31 which, from the mixing result of the mixer 5 digitized by the A/D converter, now selects the section of the mixing result which contains the target-object-specific frequency of interest and is bounded around that frequency in the time domain, over which a discrete Fourier transformation is then performed with a refined sampling step by means of the DFT frequency analyzer 30. The output of the FFT frequency analyzer 29 is also used to control the DFT frequency analyzer, as is shown in FIG. 3.

The refined sampling step of the discrete Fourier transformation of the DFT frequency analyzer can provide, for example, a spectrally oversampling calculation of the discrete Fourier transform by a factor of 100 in the selected section. The spectral line having the maximum amplitude in the frequency spectrum can be determined with a range resolution increased correspondingly by the factor of 100.

In particular, the continuous frequency spectrum is sampled at intervals $\Delta x$ or in frequency intervals $\Delta f$ of the mixing result, where $\Delta x=c/(2*B)$ and $\Delta f=1/T_{mod}$, where B in turn is the range from the lowermost to the uppermost frequency of the frequency modulation and $T_{mod}$ signifies the duration of that modulation swing.

The fast Fourier transformation is performed according to the following equation:

$$x_m = \Sigma(n=0, \ldots, N-1)\{x_n * e^{(-i \cdot 2 \cdot \pi \cdot m \cdot n/N)}\}$$

$$m=0, \ldots, N-1$$

in which $x_n$ real output value in the time domain

N number of output values $x_m$ complex result value in the frequency domain.

Given the values of B, N and $T_{mod}$ that currently are technically feasible, and allowing for movements in the measurement surroundings, it is only possible to achieve resolutions of several centimeters when the range is determined with known radar range measuring devices of the general type considered here.

But, according to the idea indicated here, the fast Fourier transformation is performed downstream and/or controlled by its result; a discrete Fourier transformation [is performed] by the DFT frequency analyzer 30 in a frequency range selected by means of the filter device 31 around the target-object-specific frequency. The equation for that band-selected discrete Fourier transformation performed with a refined sampling step reads as follows:

$$x_{m-a(x-b)} = \Sigma(n=0, \ldots, N-1)\{x_n * e^{(-i \cdot 2 \cdot \pi \cdot m \cdot n/N)}\}$$

$$m=a(x-b), \ldots, a(x+b)$$

in which $x_n$ real output value in the time domain

N number of output values $x_m$ complex result value in the frequency domain.

Figure 9:
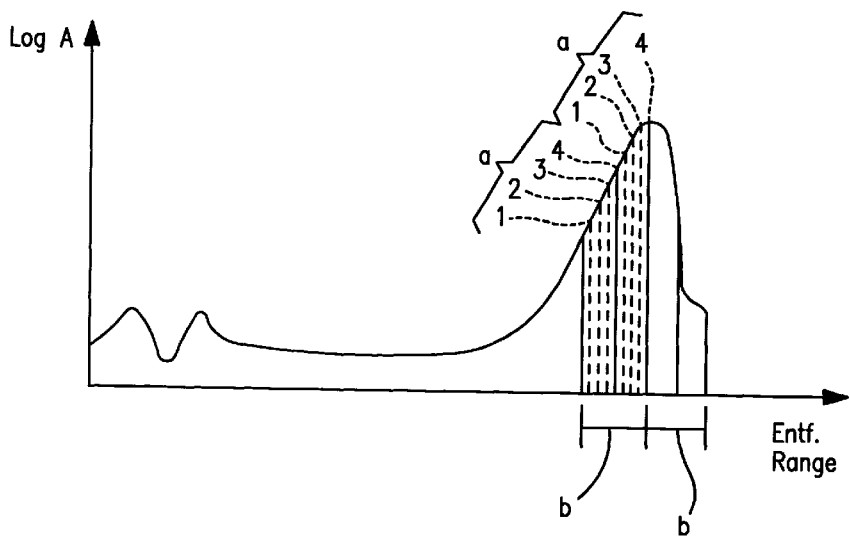
FIG. 9 shows a schematic diagram, corresponding to FIG. 8, which qualitatively illustrates the amplitude of the mixing result after analog signal treatment, plotted on a logarithmic scale versus the range.
Figure 10:
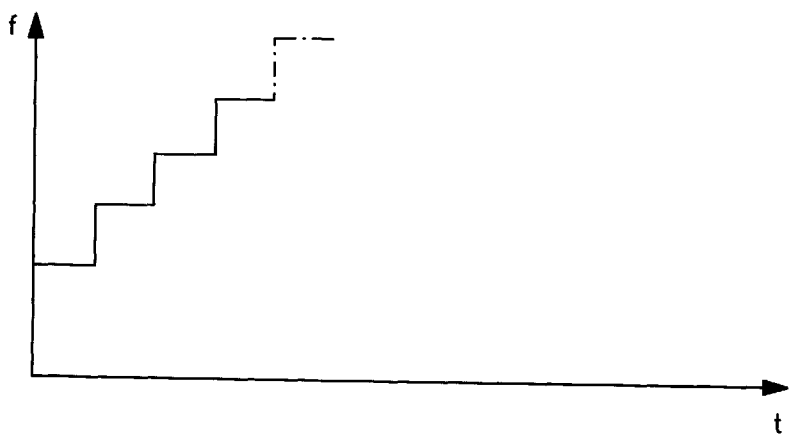
FIG. 10 shows a characteristic graph of the transmitter frequency versus time in order to explain the quasi-linear frequency modulation.

FIG. 9 clarifies the definitions of a and b in the equation above. The half bandwidth b is measured in units of the sampling steps of the FFT frequency analysis. In the example of FIG. 9, b=2. The oversampling indicates the refinement factor of the sampling steps of the discrete Fourier transformation compared to the fast Fourier transformation. In the example of FIG. 9, a=4. In practical embodiments, the factor a can be up to 100 or more.

By means of the discrete Fourier transformation performed with the device indicated here, a range resolution down into the millimeter and submillimeter region is achieved with comparatively short computation times and without the use of multiple computation cycles. If the factor a is chosen large enough, the measuring accuracy is limited by the computational accuracy. The highly exact dynamic adjustment of the frequency of the voltage-controlled oscillator 3 in the manner described above, in conjunction with the very precise determination of the target-object-specific frequency in the mixing result of the mixer 5 by means of the discrete Fourier transformation in the DFT frequency analyzer 30, makes it possible to refine the range resolution once again, since the DFT frequency analyzer 30 supplies not only the target-object-specific frequency of the mixing result but also the phase position in the form of the complex phase angle.

If one considers the mixing result at the output of the mixer 5 at a fixed frequency of, for example, 24 GHz, then the phase is rotated by 360° each time the target is displaced by a half wavelength of the transmit frequency in the direction of increasing range, i.e., each time the electrical path length for the wave running back and forth becomes larger by one wavelength. From the relationship between the transmit frequency, the phase which can be determined with an accuracy of at least 10° and the frequency of the superposition signal or mixing result with the target range, one can achieve an accuracy increase by 360/10 of the half wavelength of the transmit frequency. The computation devices required for this process can be provided as part of the DFT frequency analyzer 30 in the illustration in FIG. 3.

An example will clarify this accuracy improvement by phase evaluation:

Suppose the range determination by the DFT frequency analysis yields a range value of, for example, 10 m with an accuracy of 1 mm. At the utilized transmit frequency of 24 GHz (wavelength $\lambda$=12.49 mm), the phase of the superposition signal or mixing result of the mixer 5 rotates by 360° a total of $n_{360}$ times as the target object is displaced from 0 m to 10 m. Thus, $$n_{360}=10,000/(12.49/2)=1601.281$$

The phase rotates by 360° 1601 times during this displacement of the target object from 0 m to 10 m. To determine the range more accurately, one examines the phase of the superposition signal of the mixer, which was obtained by means of the preceding discrete Fourier transformation. If, for example, the latter amounts to 270°, then that corresponds to an addition range component of $$(270/360)\cdot\lambda/2=4.68 \text{ mm}.$$

The total range from the target is therefore $1601\cdot\lambda/2+4.68$ mm=10.0029 m.

In order to avoid jumps of $\lambda/2$ at the limits of the sampling steps owing to assignment of a particular target-object-specific frequency line to a preceding sampling step because of an inaccuracy in the discrete Fourier transform, one can calculate several frequency-limited discrete Fourier transforms of different lengths. For example, instead of 1024 sampling values, by omitting the first sampling values one can use 1010, 1000 (etc.) sampling values, whereby the start of the transmit frequency is shifted to higher values. One then obtains the spectral line of interest in the most central possible position between the beginning and end of a sampling step of the discrete Fourier transformation and thereby obtains an unambiguous phase determination.

At a measuring range of 50 m, for example, radar range measuring devices of the type indicated here achieve a range resolution in the submillimeter region. One application is, for example, the measurement of liquid level in closed tanks. In addition to the range measurement, evaluation of the amplitude of the superposition signal permits an interpretation of the target's nature, i.e., perhaps its reflection properties, size, radiation absorption, etc., which may be of importance in the exemplary application of a liquid-level measurement or indication and provides information about the nature of the tank's filling, the surface condition of the filling level, etc.

Finally, it should be pointed out that, although in the present description and in the claims we speak of a frequency-modulated continuous radiofrequency signal as the transmit signal, such a continuous signal should also be understood to encompass the fine-step modulation with controlled step plateau such as that generated by the voltage-controlled oscillator 3 in conjunction with the PLL circuit 19 and the DDS unit 17 and the processor 18.

What is claimed is:

1. A radar range measuring device comprising: a transmitter for directing a frequency-modulated continuous radio frequency signal via an antenna onto a target object placed at the range to be determined; a mixing stage for combining with one another, signals tapped from the transmitter, and echo signals received from the target object via the antenna or another antenna; a frequency analysis device for frequency analysis of the mixing result; and a display device for displaying the range corresponding to a target-object-specific frequency of the mixing result, wherein the frequency analysis device contains a first frequency analyzer for performing a fast Fourier transformation of the mixing result to generate a coarse analysis result; a filter device being controlled by the coarse analysis result to select a segment of the mixing result which is limited to a frequency band which contains a target-object-specific frequency and which is bounded around the target-object-specific frequency in the time domain; a second frequency analyzer for performing a band-selected discrete Fourier transform on the segment of the mixing result including the frequency band selected by the filter device, the second frequency analyzer being coupled to the display device, the second frequency analyzer using a sampling step which is refined relative to the sampling step of the first frequency analyzer.

2. The device according to claim 1, wherein the radio frequency signal of the transmitter has linear frequency modulation.

3. The device according to claim 1 comprising an analog-to-digital converter for digitizing the mixing result of the mixing stage, wherein the first frequency analyzer performs a digital fast Fourier transformation and the filter device is a digital group-delay-compensated bandpass filter.

4. The device according to claim 3 comprising an analog signal processing circuit is located between the mixing stage and the analog-to-digital converter.

5. The device according to claim 4, wherein the analog signal processing circuit contains at least one band-stop filter for suppressing interference frequencies in the frequency spectrum of the output signal of the mixer.

6. The device according to claim 4, wherein the analog processing circuit contains a differentiator to amplify the output signal of the mixer in direct dependence on the frequency of the output signal.

7. The device according to claim 4, wherein the analog signal processing circuit contains an antialiasing filter.

8. The device according to claim 1, wherein the second frequency analyzer supplies, in addition to information about the target-object-specific frequency of the mixing result of the mixing stage, an output signal corresponding to the phase position of the oscillation at the target-object-specific frequency, and wherein the radar range measuring device further comprises a computation device for converting the phase position into a corresponding fraction of the wavelength of the target-object-specific frequency and for adding the fraction to the sum of the whole wavelengths calculated from the target-object-specific frequency in order to refine the measurement result.

9. The device according to claim 1, comprising an analog-to-digital converter for sampling the mixing result, wherein the sampling is performed with omission of first samples in measuring cycles with a decreasing number of samples such that the target-object-specific frequency in the mixing result of the mixing stage lies approximately mid-way between the sampling steps of the discrete Fourier transformation.

10. A radar range measuring device with a transmitter directing a frequency-modulated continuous radio frequency signal via an antenna onto a target object placed at the range to be determined; with a mixing stage which combines with one another, on the one hand, signals tapped from the transmitter, and, on the other hand, echo signals received from the target object via the antenna or another antenna; with a frequency analysis device for frequency analysis of the mixing result; and with a display device to display the range corresponding to a target-object-specific frequency of the mixing result, characterized in that the frequency analysis device contains a first frequency analyzer which is used to control a filter device which selects a section of the mixing result which contains a target-object-specific frequency and is bounded around that frequency in the time domain, over which a discrete Fourier transformation is performed by means of another frequency analyzer which is coupled to the display device, using a sampling step which is refined relative to the sampling step of the first frequency analyzer, and characterized in that the frequency-modulated continuous radio frequency signal is generated by a voltage-controlled oscillator whose tuning voltage is supplied by a phase comparator via loop filter, specifically in the form of an I controller or a PI controller or a PID controller, one input signal to the phase comparator being supplied from the output of the voltage-controlled oscillator via a frequency divider, while the other input signal to the phase comparator is a frequency setpoint-value signal corresponding to a fraction of the frequency of the transmitter output oscillation corresponding to the divider ratio of the frequency divider.

11. The device according to claim 10, characterized in that the frequency setpoint-value signal supplied to the phase comparator is produced by a circuit unit for direct digital synthesis which receives from a processor digital words corresponding to consecutive frequency values in dependence on the frequency modulation of the transmitter.

12. The device according to claim 10, characterized in that for the linear frequency modulation of the radio frequency signal the latter is modulated in a stepwise and quasistationary linear manner and is recalibrated during the sampling steps.

* * * * *